United States Patent [19]

Shirasaki et al.

[11] Patent Number: 4,696,810

[45] Date of Patent: Sep. 29, 1987

[54] WET PROCESS FOR THE PRODUCTION OF A READILY SINTERABLE POWDER MATERIAL OF PEROVSKITE OR ITS SOLID SOLUTION

[75] Inventors: Shin-ichi Shirasaki, Sakura; Yasunari Hotta, Otsu; Hiroshi Yamamura, Sakura; Shin-ichi Matsuda, Ibaraki; Kazuyuki Kakegawa, Saitama; Yusuke Moriyoshi, Sakura; Koichiro Takahashi, Sakura; Hajime Haneda, Sakura, all of Japan

[73] Assignee: National Institute for Researches in Inorganic Materials, Niihari, Japan

[21] Appl. No.: 847,148

[22] Filed: Apr. 2, 1986

Related U.S. Application Data

[63] Continuation of Ser. No. 717,034, Mar. 28, 1985.

[30] Foreign Application Priority Data

Aug. 16, 1984 [JP] Japan .............................. 59-171244
Aug. 16, 1984 [JP] Japan .............................. 59-171245
Aug. 16, 1984 [JP] Japan .............................. 59-171246

[51] Int. Cl.$^4$ .................... C01G 25/02; C01G 23/04
[52] U.S. Cl. .................................. 423/593; 423/598; 423/263

[58] Field of Search .............. 423/593, 594, 263, 598, 423/608, 619, 636, 637, 21.1, 71, 92, 158

[56] References Cited

FOREIGN PATENT DOCUMENTS 112159 6/1984 European Pat. Off. ............ 423/593
1122380 8/1968 United Kingdom ................ 423/593
165686 10/1964 U.S.S.R. ............................... 423/593

Primary Examiner—Robert L. Stoll
Attorney, Agent, or Firm—Oblon, Fisher, Spivak, McClelland, & Maier

[57] ABSTRACT

A process for producing a powder material of perovskite or its solid solution represented by the formula:

$$ABO_3$$

wherein A is one or more metal elements coordinated with 12 oxygen atoms, and B is one or more metal elements coordinated with 6 oxygen atoms, which comprises contacting an aqueous or alcohol solution of either component A or component B with a precipitating solution to form precipitates, then adding an aqueous or alcohol solution of the other component to form precipitates, and drying the precipitates, followed by calcining at a temperature of from 400° to 1200° C.

2 Claims, No Drawings

WET PROCESS FOR THE PRODUCTION OF A READILY SINTERABLE POWDER MATERIAL OF PEROVSKITE OR ITS SOLID SOLUTION

This application is a continuation, of application Ser. No. 717,034, filed 3/28/85.

BACKGROUND OF THE INVENTION

1. Field of the Invention

The present invention relates to a process for producing a readily sinterable powder of perovskite or its solid solution. Such perovskite and solid solution are widely used in the field of functional ceramics such as piezo electric elements, optoelectronics materials, dielectrics, semiconductors, and sensors. Reflecting the recent progress in the high quality functional ceramics, there has been an increasing demand for an inexpensive, readily sinterable, uniform, high packing-density powder material which satisfies the requirements for such high quality functional ceramics.

2. Description of the Prior Art

A dry process and a wet process have been known for the production of a powder material of perovskite or its solid solution.

The dry process is a process wherein starting material powders are mixed and the mixture is then calcined. By such a process, however, it is hardly possible to obtain a powder material of a uniform composition. However, the product will have no adequate sinterability, and it will be difficult to prepare, from such a product, a perovskite solid solution having an excellent functionality.

On the other hand, the wet process is a process in which a solution containing all the constituting components, is prepared and added to a precipitating solution such as an alkaline solution for coprecipitation, and the coprecipitates thereby formed are then dried and calcined (hereinafter referred to as a "coprecipitation method").

According to this coprecipitation method, a powder having a superior uniformity is obtainable. However, because of this uniformity, particles are likely to coagulate during the precipitation, drying or calcining process and form secondary particles, whereby it is hardly possible to obtain a readily sinterable product.

Further, in the coprecipitation method, the concentration of the precipitating solution at the time of the addition is uniform, and the precipitate-forming abilities of the respective components differ from one another. For instance, a certain component may precipitate 100%, while another component may not precipitate completely, whereby it may be difficult to obtain a desired composition.

Furthermore, in many cases, the perovskite solid solution contains lead (a metal element coordinated with 12 oxygen atoms, which corresponds to component A mentioned hereinafter) and titanium (a metal element coordinated with 6 oxygen atoms, which corresponds to component B mentioned hereinafter) simultaneously. For the industrial production of such a solid solution, it is desired to use titanium tetrachloride or titanium sulfate which is inexpensive as a titanium material. However, when titanium tetrachloride, for example, is used for the coprecipitation method, chlorine ions in the titanium tetrachloride are likely to react with lead ions and form white precipitates. Therefore, titanium tetrachloride is hardly useful for the coprecipitation method. Such undesirable precipitation may be prevented by using titanium oxynitrate (TiO(NO$_3$)$_2$) instead of titanium tetrachloride. However, it is not practical to use titanium oxynitrate in an industrial operation, since it is too expensive.

SUMMARY OF THE INVENTION

It is an object of the present invention to overcome the drawbacks of the conventional coprecipitation method, and to provide a wet process for producing a powder material of perovskite or a solid solution thereof which satisfies the four requirements i.e. the efficient sinterability, uniformity, low cost, and high packing density.

According to the first aspect of the present invention, the above object can be attained by a process for producing a powder material of perovskite or its solid solution represented by the formula:

$$ABO_3$$

wherein A is one or more metal elements coordinated with 12 oxygen atoms, and B is one or more metal elements coordinated with 6 oxygen atoms, which comprises contacting an aqueous or alcohol solution of either component A or component B with a precipitating solution to form precipitates, then adding an aqueous or alcohol solution of the other component (B or A) to form precipitates, and drying the precipitates, followed by calcining at a temperature of from 400° to 1200° C.

According to the second aspect of the present invention, there will be provided a process for producing a readily sinterable powder material of a perovskite solid solution represented by the formula:

$$ABO_3$$

wherein A is one or more metal elements coordinated with 12 oxygen atoms, and B is one or more metal elements coordinated with 6 oxygen atoms, provided that the sum of the constituting metal elements of components A and B is at least 3, which comprises contacting an aqueous or alcohol solution of components A and B devoid of at least one member of the constituting metal elements, with a precipitating solution to form precipitates, and drying and calcining the precipitates at a temperature of from 120° to 1200° C., and mixing thereto a compound of the initially omitted member of the constituting metal elements, and calcining the mixture at a temperature of from 400° to 1200° C.

According to the third aspect, the present invention provides a process for producing a readily sinterable powder material of a perovskite solid solution represented by the formula:

*ABO*$_3$ wherein A is one or more metal elements coordinated with 12 oxygen atoms, and B is one or more metal elements coordinated with 6 oxygen atoms, provided that the sum of the constituting metal elements of components A and B is at least 3, which comprises preparing at least one aqueous or alcohol solution of a mixture comprising at least one metal element of component A and at least one metal element of component B, preparing, if necessary, one or more aqueous or alcohol solutions of at least one metal element of component A or B other than the metal elements in the foregoing solution, consecutively adding these solutions to a precipitating solution to form precipitates consecutively, and drying the precipitates, followed by calcining at a temperature of from 400° to 1200° C.

PREFERRED EMBODIMENTS OF THE INVENTION

The process according to the first aspect of the present invention is based on a discovery that the drawbacks of the conventional coprecipitation method can be overcome by firstly preparing an aqueous or alcohol solution containing one or more metal elements of component A, then adding the solution to a precipitating solution to form precipitates or coprecipitates, thereafter adding an aqueous or alcohol solution of one or more metal elements of component B to form precipitates, drying the precipitates thereby obtained, and calcining them at a temperature of from 400° to 1200° C. to obtain a powder material. The order for the formation of the precipitates of component A and component B may be reversed. Further, the formation of the precipitates of component A and component B may be conducted in a plurality of stages, or may be carried out alternately.

As the metal element coordinated with 12 oxygen atoms, of component A in the above formula, there may be mentioned, for instance, rare earth elements such as Pb, Ba, Ca, Sr and rare earth elements such as La. As the metal element coordinated with 6 oxygen atoms, of component B, there may be mentioned, for instance, Ti, Zr, Mg, Sc, Hf, Th, W, Nb, Ta, Cr, Mo, Mn, Fe, Co, Ni, Zn, Cd, Al, Sn, As and Bi.

As the combination of two or more metal elements of component B in perovskite or its solid solution, there may be mentioned a combination of elements having the same valency such as a combination of $Ti^{4+}$ and $Zr^{4+}$, or a combination of such elements with their proportions optionally varied; a combination of elements to satisfy the electrically neutral condition as a whole at the B-position, such as a combination of $\frac{1}{2}Fe^{3+}$ and $\frac{1}{2}Nb^{5+}$, $\frac{2}{3}Fe^{3+}$ and $\frac{1}{3}W^{6+}$, or $\frac{1}{3}Mg^{2+}$ and $\frac{2}{3}Nb^{5+}$. Further, there may be a combination wherein an excess or deficient electric charge at the position of component A or component B is complemented by the formation of a cation defect or an anion defect, such as a combination of $Ti^{4+}$ and $W^{6+}$ (complement of a cation defect) or a combination of $Ti^{4+}$ and $Al^{3+}$ (complement of an anion defect) of component B, or a combination of $La^{3+}$ and $Ba^{2+}$ (complement of a cation defect) of component A. Further, perovskite and its solid solution according to the present invention includes non-stoichiometric perovskite wherein the molar ratio of components A and B is disproportionated to a value higher or lower than 1.0, and defects are provided at the B- or A-position.

As the compounds useful for the preparation of the aqueous or alcohol solutions of the constituting metal elements of components A and B of the perovskite or its solid solution, there may be mentioned hydroxides, carbonates, sulfates, chlorides, nitrates, acetates, formates, oxalates, oxides or metals of such elements. When they are not soluble in water or an alcohol, they may be made soluble by an addition of a mineral acid. These solutions are prepared separately.

As the precipitating solution, there may be mentioned a solution of ammonia, ammonium carbonate, sodium hydroxide, potassium hydroxide or oxalic acid. A suitable solution may be selected from these solutions. In order to form the precipitates of the constituting elements, the aqueous or alcohol solution of the constituting elements may be added while stirring the precipitating solution. Otherwise, the precipitating solution may be added to the aqueous or alcohol solution of the constituting elements. It is preferred to conduct the addition while stirring the solution.

The technique in this patent may also be undertaken in such a manner that after the formation of the precipitates of component A, filtration is carried out to remove anions which may interfere with the subsequent processes, whereupon the precipitates are dispersed in fresh water or alcohol, then a precipitating solution is added, and an aqueous or alcohol solution of component B is then added to form precipitates.

Furthermore, it is possible that after the formation of the precipitates of component A, the type and the concentration of the precipitating solution are optionally selected and adjusted to make the condition most suitable for the formation of the precipitates of component B.

In a case where small amounts of additional components are added to control the sinterability or characteristics of the perovskite, in addition to components A and B, such additional components may be added at the time of the preparation of the solutions of components A and B. As mentioned above, the formation of precipitates of components A and B may be conducted in a plurality of stages, or they may be precipitated alternately. Having thus formed the precipitates, it is possible to obtain highly dense precipitates containing all the components. The precipitates thus obtained are then dried and calcined at a temperature of from 400° to 1200° C., whereby a uniform and readily sinterable powder material of perovskite or its solid solution is obtainable. If the calcining temperature is less than 400° C., the dehydration and thermal decomposition of the highly dense precipitates will be inadequate. On the other hand, if the temperature exceeds 1200° C., the powder tends to be coarse. Therefore, the temperature should be from 400° to 1200° C.

Thus, according to the process of the first aspect of the present invention, the whole components do not coprecipitate as in the conventional method, but form precipitates consecutively, whereby it is possible to obtain precipitates wherein two or more phases are highly dispersed from one another. As a result, the precipitates hardly undergo coagulation during the precipitation, drying or calcining process, whereby it is possible to obtain a readily sinterable powder having a high packing density.

Further, the following excellent effects are obtainable.

(1) By properly selecting the component to be precipitated first, it is possible to make it easy to control the powder characteristics of the precipitates which will be formed subsequently. Further, the type and the concentration of the precipitating solution can be selected or adjusted to be suitable for the formation of the particular component, whereby it is possible to precipitate all the components completely and in good yield. Thus, a readily sinterable powder having a desired composition can readily be obtained.

(2) In the case of the production of perovskite containing lead and titanium simultaneously, the formation of the precipitates of the respective ions is conducted in separate steps, and it is possible to use inexpensive titanium tetrachloride as the starting material, whereby such perovskite can be produced inexpensively on an industrial scale.

Further, according to this process, the respective phases are intimately dispersed in one another, and accordingly, adequate uniformity can be attained by the calcining of such precipitates. The process is simple, and accordingly the product can be obtained at a low cost.

EXAMPLE 1

0.1 mol of titanium tetrachloride (component B) and 0.1 mol of zirconium oxychloride (component B) were dissolved in 1 liter of water to obtain an aqueous solution of an equimolar mixture of $Ti^{4+}$ and $Zr^{4+}$. This solution was gradually dropwise added to 1 liter of 3N aqueous ammonia under stirring to form white coprecipitates of hydroxides of Zr and Ti. To this dispersion of coprecipitates, a solution of 0.2 mol of lead nitrate in 300 cc of water was added to form intimate precipitates of hydroxides of Zr, Ti and Pb. After washing off adsorbed $Cl^-$ and $NO_3^-$ ions with water, the precipitates were dried and calcined at 750° C. for about two hours to obtain $Pb(Zr_{0.5}.Ti_{0.5})O_3$ powder (useful for piezo electric ceramics). The powder was pulverized in a ball mill. By the pulverization, the sinterability was further improved. This powder was observed by a scanning electron microscope, whereby the powder was found to have a uniform particle size of about 0.3 μm. The relation of $\beta\cos\theta - \sin\theta$ by X-ray diffractiometry (where $\beta$ is the half-value width of the diffraction spectrum, and $\theta$ is the Bragg angle) was plotted, whereby it was found to have a uniform composition without any compositional fluctuations in parallel with the abscissa (sin $\theta$ axis).

This powder was compacted under a pressure of $1t/cm^2$, and sintered in a lead vapor atmosphere at 1220° C. for about two hours, whereupon the density was 7.93 which is very close to the theoretical density. Further, the bulk density of the compact before sintering was 4.85, which is as high as about 60% of the theoretical density.

COMPARATIVE EXAMPLE 1

Commercially available powders of PbO, $TiO_2$ and $ZrO_2$ were mixed to have a composition of $Pb(Zr_{0.5}.Ti_{0.55})O_3$, and mixed in a ball mill. The mixture was calcined at 800° C. for about two hours, and again pulverized in a ball mill. This powder was compacted under a pressure of $1t/cm^2$, and sintered in a lead vapor atmosphere at 1220° C. for about two hours, whereupon the density was about 6.5, and substantial composition fluctuation was observed.

The process according to the second aspect of the present invention is based on a discovery that a uniform, readily sinterable powder material of a perovskite solid solution having a high bulk density is obtainable by preparing an aqueous or alcohol solution of components A and B devoid of at least one member of the constituting metal elements of components A and B, adding the solution to a precipitating solution to form precipitates, drying and calcining the precipitates, and mixing thereto a compound of the initially omitted member of the constituting metal elements, and calcining the mixture at a temperature of from 400° to 1200° C.

Components A and B are the same as described with respect to the first aspect of the present invention, except that the sum of the constituting metal elements of components A and B of the perovskite solid solution $ABO_3$ is at least 3.

As mentioned above, the aqueous or alcohol solution may be prepared by dissolving, for example, hydroxides, carbonates, sulfates, nitrates, acetates, formates, oxalates, oxides or metals of the constituting elements of components A and B. If these compounds are not soluble in water or an alcohol, they may be made soluble by an addition of mineral acid.

The precipitating solution and the manner for the formation of the precipitates may be the same as described with respect to the process according to the first aspect of the present invention.

The coprecipitates obtained is dried and calcined at a temperature of from 120° to 1200° C., prior to the addition of a compound of the initially omitted member of the constituting metal elements.

The initially omitted member of the constituting metal elements is added preferably in the form of an oxide. However, it may be in the form of a salt. In the case where the initially omitted member comprises more than two types of metal elements, it may be in the form of the coprecipitates of such elements or their calcined products. Further, in order to control the sinterability or characteristics of the powder material for the purpose of using the perovskite as various functional ceramics, very small amounts of additional components are usually added. Such additional components are preferably added at the time of the preparation of the aqueous or alcohol solution, whereby the additional components can be incorporated uniformly.

The powder mixtures thus obtained are dried and calcined at a temperature of from 400° to 1200° C. to obtain a uniform readily sinterable powder material of a perovskite solid solution. If the calcining temperature is less than 400° C., the solid phase reaction of the powder mixture will be inadequate. On the other hand, if the temperature exceeds 1200° C., the powder tends to be coarse. Thus, the calcining temperature should be from 400° to 1200° C.

The process according to the second aspect of the present invention has a feature that readily sinterable fine particles having a high bulk density are obtainable without formation of the secondary particles in the coprecipitating step and the step of calcining the mixture of the coprecipitates and the compound of the initially omitted member of the constituting metal elements. Further, in the case where it is difficult to completely coprecipitate in good yield all the components of the intended perovskite by the precipitating solution having a predetermined initial concentration, it is possible to obtain the intended perovskite composition by firstly coprecipitating all the elements except for the elements having an inadequate precipitation ability, and subsequently mixing the omitted elements to the coprecipitates, followed by the calcining. Further, in the case where a perovskite containing lead and titanium is to be prepared, one of them is subjected to the coprecipitation, and the other is mixed in a solid state, whereby it is possible to employ inexpensive titanium tetrachloride.

The initially coprecipitated product does not have any fluctuation in the composition. Even when the compound of the intially omitted component is added thereto, mixed and calcined, the resulting product has a uniformity comparable to the product obtained by the conventional wet system coprecipitation method. Further, the process is simple, and the product can be obtained at a low cost.

EXAMPLE 2

An aqueous solution containing 24.84 g of lead nitrate (component A) and an aqueous solution obtained by dissolving 2.502 g of calcium carbonate (component A) in dilute nitric acid, were mixed to obtain 1 liter of an aqueous solution mixture containing $Pb^{2+}$ and $Ca^{2+}$. This aqueous solution mixture was added to 1 liter of 3N aqueous ammonia under stirring to coprecipitate hydroxides of the two components. The precipitates are dried, and calcined at 700° C. for about two hours. Then, 7.99 g of a rutile powder ($TiO_2$, component B) was mixed therewith in a ball mill, and the mixture was calcined at 700° C. for about two hours, whereby a powder of $(Pb_{0.75}.Ca_{0.25})TiO_2$ (useful for piezo electric ceramics having an anisotropic electromechanical connection coefficient). This powder had a uniform particle size of about 0.3 μm. The relation of $\beta\cos\theta$ (ordinate) $-\sin\theta$ (abscissa) according to the X-ray diffractiometry was plotted and analyzed, whereby it was confirmed that there was no substantial change in the composition.

The powder was compacted under a pressure of $1t/cm_2$, and sintered in a lead vapor atmosphere at 1220° C. for about two hours. The sintered product had a density of 7.2, which is very close to the theoretical density. Further, the bulk density of the compact prior to the sintering was 4.3, which is as high as 60% of the theoretical density.

COMPARATIVE EXAMPLE 2

Commercially available powders of PbO, $CaCO_3$ and $TiO_2$ were mixed to have a composition of $(Pb_{0.75}.Ca_{0.25})TiO_2$, and mixed in a ball mill. The mixture was calcined at 800° C. for about two hours, and again pulverized in a ball mill. The powder was compacted under a pressure of $1t/cm_2$, and sintered in a lead vapor atmosphere of 1220° C. for about two hours. The density of the sintered product was about 6.3. From the X-ray diffraction spectrum of the powder, a substantial change in the composition was observed.

The process according to the third aspect of the present invention is based on the discovery that the drawbacks of the conventional coprecipitation method can be overcome by preparing at least one aqueous or alcohol solution of a mixture comprising at least one metal element of component A and at least one metal element of component B, preparing, if necessary, one or more aqueous or alcohol solutions of one or more metal elements of component A or B other than the metal elements in the above mentioned solution, consecutively adding the plurality of solutions in any appropriate order to a precipitating solution to form precipitates, and drying the precipitates, followed by calcining at a temperature of from 400° to 1200° C.

Components A and B are the same as described with respect to the first aspect of the present invention, except that the sum of the constituting metal elements of components A and B of the perovskite solid solution ABO is at least 3.

As mentioned above, compounds of components A and B to be used as the starting materials for the preparation of the aqueous or alcohol solution may be in the form of hydroxides, carbonates, sulfates, nitrates, acetates, formates, oxalates, oxides or metals of the metal elements of the respective components. If such compounds are not soluble in water or alcohol, they may be made soluble by an addition of a mineral acid.

The precipitating solution and the manner of forming the precipitates, are the same as described with respect to the process according to the first aspect of the present invention.

The precipitates thus obtained are dried and calcined at a temperature of from 400° to 1200° C., whereby a uniform readily sinterable powder material of a perovskite solid solution is obtainable. If the calcining temperature is less than 400° C., the dehydration or the thermal decomposition of the dense precipitates will be inadequate. On the other hand, if the temperature exceeds 1200° C., the powder tends to be coarse. Therefore, the temperature should be from 400° to 1200° C.

The process according to the third aspect of the present invention is suitable for the production of a perovskite solid solution. In contrast with the conventional method wherein whole components are simultaneously coprecipitated, the respective components are sequentially precipitated to form laminated precipitates (the respective components are selected not to adversely affect one another) wherein the plurality of components are intimately dispersed in one another, whereby the grain growth during the formation of the precipitates, the drying operation or the calcining operation, is suppressed, and the formation of secondary particles will be minimum. Accordingly, when calcined, a readily sinterable powder having a high bulk density is readily obtainable. Further, by properly selecting the component to be precipitated first, it is possible to make it easy to control the powder characteristics of the precipitates to be formed subsequently.

Furthermore, the type and the concentration of the precipitating solution can be selected or adjusted to be most suitable for the formation of the precipitates of any particular component. It is possible to completely precipitate all the components in good yield. Thus, a readily sinterable powder material having a desired composition can readily be obtained. Further, for the production of a perovskite containing lead and titanium simultaneously, the respective ions may be precipitated in different stages, whereby it is possible to use inexpensive titanium tetrachloride as the starting material, and it is possible to conduct the production in an industrially inexpensive manner. In the precipitates obtained by these steps, the respective phases are mutually highly dispersed in one another. Accordingly, the product obtained by calcining such precipitates, has a uniformity comparable to the one attainable by the coprecipitation method. The process is simple, and the product can be obtained at a low cost.

EXAMPLE 3

45.67 cc of a solution containing 1.1735 mol/liter of zirconium oxynitrate (component B), an aqueous dilute nitric acid solution containing 20.0871 g of PbO (component A) and an aqueous dilute nitric acid solution containing 1.629 g of $La_2O_3$ (component A) were prepared and mixed to bring the total volume to 1.5 liters. While stirring this aqueous solution, excess aqueous ammonia was added to form coprecipitates of hydroxides of the three components of Pb, La and Zr. The stirring was continued, and 27.30 cc of an aqueous solution containing 1.6076 mol/liter of titanium tetrachloride was added thereto, whereby intimate precipitates of hydroxides of Pb, La, Zr and Ti were obtained. The precipitates were washed, dried and then calcined at 700° C. for about two hours. Then, they were treated in a ball mill and again calcined at 700° C. for about two hours to obtain a powder of $[(Pb_{0.91}La_{0.09})(Zr_{0.55}Ti_{0.45})_{0.975}]O_3$. From the observation of the powder by means of a scanning type electron microscope, it was found to contain no substantial secondary particles and have a uniform particle size of about 0.4 μm. The relation of $\mu\cos\theta$ (ordinate)-$\sin\theta$ (abscissa) by the X-ray diffractiometry (where $\beta$ is the half-value width, and $\theta$ is the Bragg angle) was plotted and found to be parallel with the abscissa, whereby it was confirmed that the fluctuation in the composition was negligible. The powder was compacted under a pressure of $1t/cm^2$, placed in an alumina dies by using zirconia powder as a releasing agent, and hot-pressed at a temperature of 1220° C. in an oxygen atmosphere for about 10 hours, whereby light-transmitting PLZT (light transmission of 75%, thickness: 1 mm) was obtained. Further, the bulk density of the compact prior to the hot-pressing, was 4.90, which is as high as 62% of the theoretical density.

COMPARATIVE EXAMPLE 3

Commercially available powders of PbO, $Ti_2$, $La_2O$ and $ZrO_2$ were mixed to have a composition of $[(Pb_{0.91}La_{0.09})(Zr_{0.55}Ti_{0.45})_{0.975}]O_3$, and mixed in a ball mill. The mixture was then calcined at 800° C. for about two hours, and treated again in a ball mill to obtain a powder. This powder was compacted under a pressure of $1t/cm^2$. Then, a sintered product was prepared in the same manner as in Example 3. The sintered product thereby obtained did not have an adequate light transmittance. Further, from the X-ray diffraction, a substantial change in the composition was observed.

What is claimed is:

1. A process for producing a powdered perovskite represented by the formula:

$$ABO_3$$

wherein A is selected from the group consisting of Pb, Ba, Ca, Sr and La; and B is selected from the group consisting of Ti and Zr, which comprises contacting in a vessel an aqueous or alcohol solution of an ion of either component A or component B with a precipitating solution selected from the group consisting of solutions of ammonia, ammonium carbonate, sodium hydroxide, potassium hydroxide and oxalic acid, to form a first precipitate of said component, mixing in said vessel an aqueous or alcohol solution of the other component thereby forming a second precipitate of said other component, drying and calcining the resulting powder mixture at a temperature of from 400° to 1200° C., wherein during said calcining a solid phase reaction occurs in said powder mixture to form said perovskite.

2. A process for producing a powdered perovskite represented by the formula:

$$ABO_3$$

wherein A is selected from a group consisting of Pb, Ba, Sr and La; and B is selected from the group consisting of Ti and Zr, which comprises preparing at least one aqueous or alcohol solution of a mixture of ions comprising at least one member of component A and at least one member of component B, preparing one or more aqueous or alcohol solutions of ions of at least one member of component A or component B other than the members used in the previous solution, consecutively adding these solutions to a precipitating solution selected from the group consisting of solutions of ammonia, ammonium carbonate, sodium hydroxide, potassium hydroxide and oxalic acid, to form precipitates consecutively, and drying and calcining the resulting powder mixture at a temperature of from 400° to 1200° C., wherein during said calcining a solid phase reaction occurs in said powder mixture to form said powdered perovskite.

* * * * *